United States Patent [19]

Marquardt, Jr.

[11] 4,103,123
[45] Jul. 25, 1978

[54] GROUNDING DEVICE

[75] Inventor: Lloyd B. Marquardt, Jr., Aberdeen, S. Dak.

[73] Assignee: Northwestern Public Service Company, Huron, S. Dak.

[21] Appl. No.: 810,191

[22] Filed: Jun. 27, 1977

[51] Int. Cl.² .......................................... H01H 31/00
[52] U.S. Cl. ................................................ 200/48 R
[58] Field of Search ............... 200/48, 49, 52; 313/49, 313/51, 325

[56] References Cited

U.S. PATENT DOCUMENTS

| Re. 24,216 | 9/1956 | Heberlein | 200/48 |
|---|---|---|---|
| 655,047 | 7/1900 | Bossert | 200/52 |
| 1,463,304 | 7/1923 | Bingay | 200/48 R |
| 1,957,814 | 5/1934 | Anderson | 200/48 R |

FOREIGN PATENT DOCUMENTS 666,586  1/1961  Canada ............................ 200/48 R Primary Examiner—Ro E. Hart
Attorney, Agent, or Firm—Merchant, Gould, Smith, Edell, Welter & Schmidt

[57] ABSTRACT

A procedure and apparatus for increasing the ease and safety of making grounding connections in electrical distribution systems having access areas including switch and fuse blades removable by hot stick operation. A grounding blade physically interchangeable with standard fuse and switch blades is provided with convenient connections for receiving a grounding cable or cables, so that either end of the blade, or both ends thereof, can be grounded, whereby to ground system components connected thereto.

4 Claims, 13 Drawing Figures

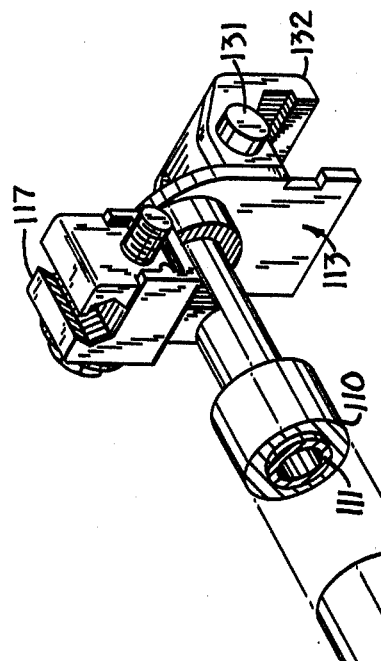
FIG.5 PRIOR ART
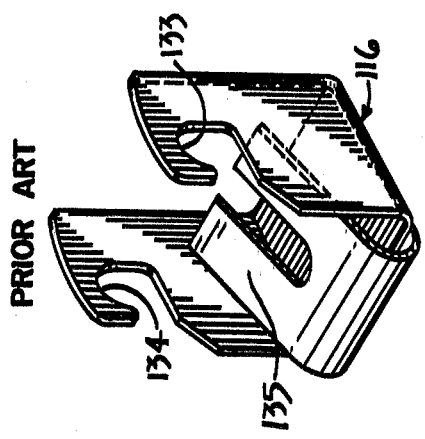
FIG.3
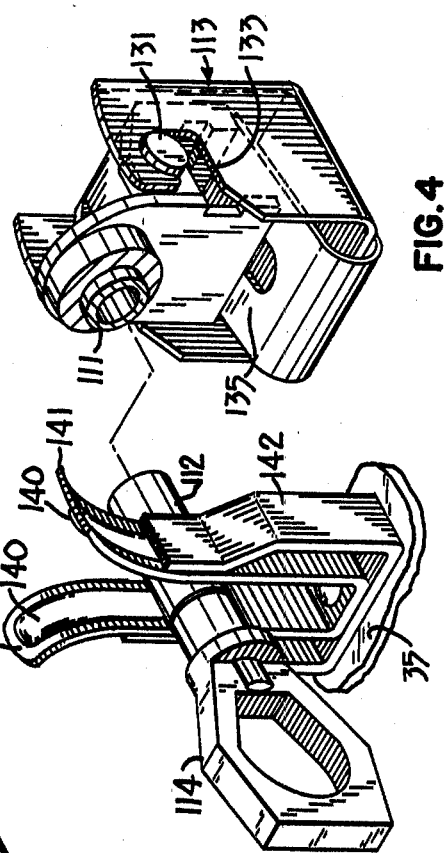
FIG.4
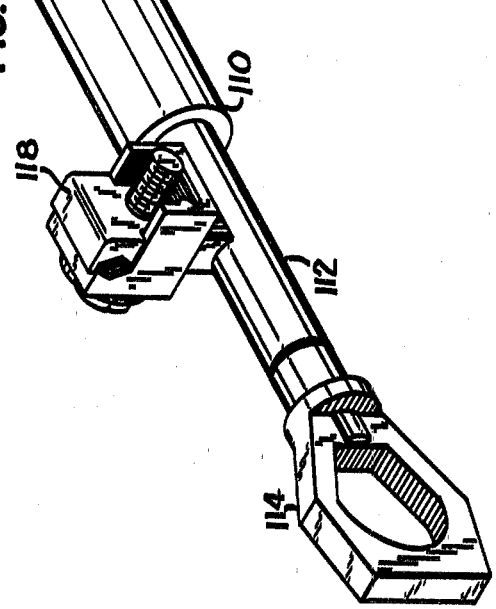

GROUNDING DEVICE

BACKGROUND OF THE INVENTION

This invention relates to the field of electrical engineering, and particularly to apparatus and procedures for performing grounding operations, in maintaining high voltage electrical distribution systems, which are necessary for the safety of maintenance personnel.

In electrical distribution systems conductors are brought to terminals in access areas at the location of step down transformers, circuits there being complete by removable switch or fuse blades. When faults develop requiring work on either the conductors or the transformers, the elements involved must be disconnected from the rest of the system, and for additional safety all such disconnected parts must be grounded to prevent injury to personnel in the event of inadvertent reconnection to the energy source. The crowded nature of the space within access areas is such that making the desired ground connections is sometimes difficult or hazardous.

SUMMARY OF THE INVENTION

My invention comprises substituting, for the removable switch blades and fuse blades in such access areas, one or more new grounding blades by which equipment connected to either or both of the blade terminals may be easily and safely grounded without need to make further disconnections or additional connections to the system components.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing,

FIG. 3 is a perspective view, of a grounding blade according to my invention;

FIG. 4 is a fragmentary showing of how my blade interacts with standard terminal devices, one of which is shown separately in FIG. 5;

DESCRIPTION OF THE PREFERRED EMBODIMENT

Figure 1:
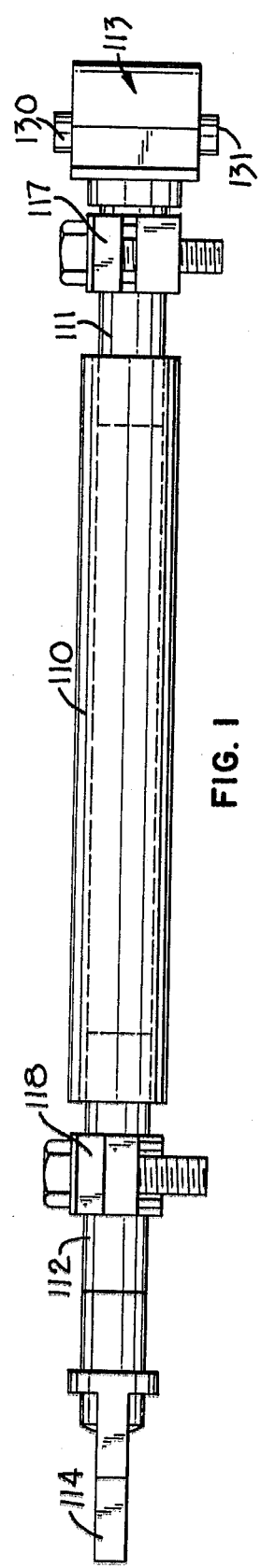
FIGS. 1 and 2 are plan and side elevational views.
Figure 2:
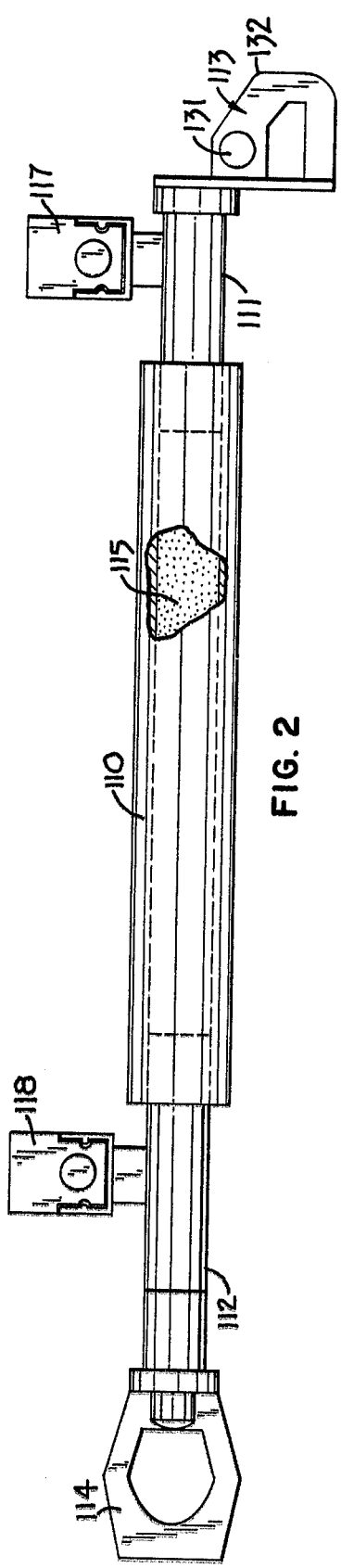
Figure 6:
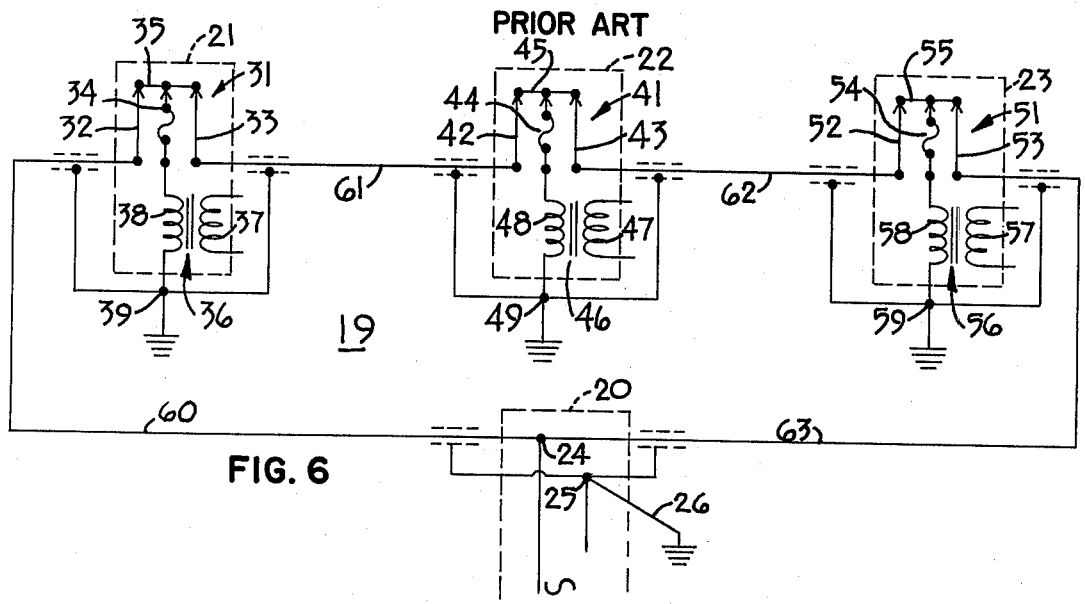
FIGS. 6 and 7 show standard circuitry and FIGS. 8-10 show standard equipment, with which my equipment is to be used.
Figure 7:
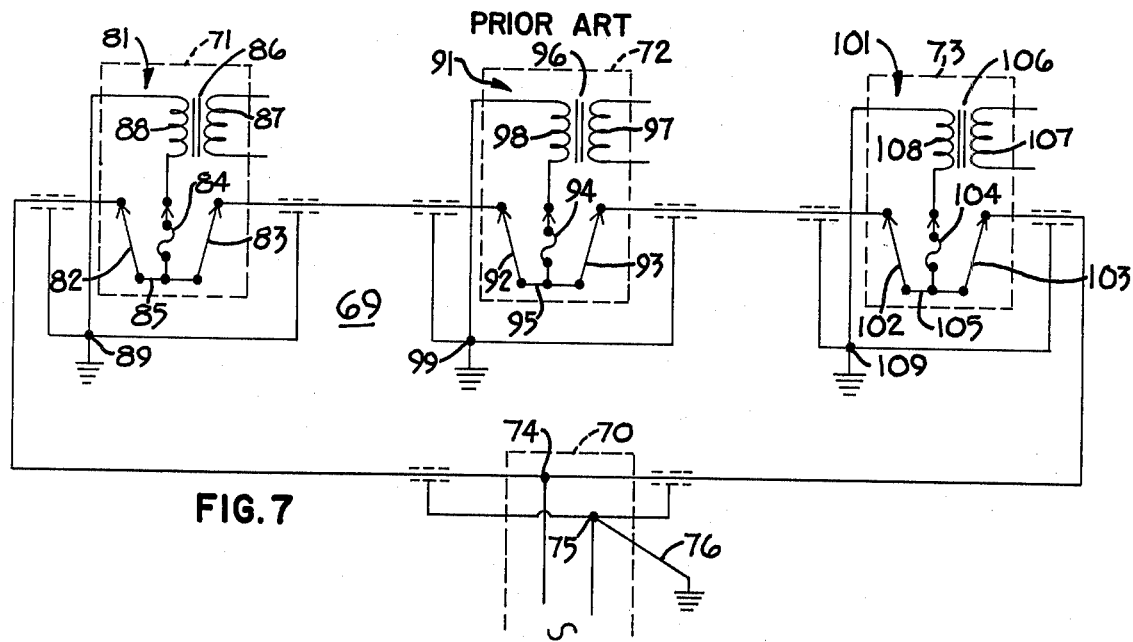

Before describing the details of construction and use of my inventive grounding blade, attention should be directed to FIGS. 6 and 7 showing distribution systems of two recognized types. FIG. 6 shows an electrical distribution system 19 made up of a power station 20 and three sub-stations 21, 22 and 23. Power station 20 is shown schematically as supplying high voltage electricity between a pair of terminals 24 and 25, the latter of which is grounded at 26.

Sub-station 21 includes an access area 31 including switch blades 32 and 33 and a fuse blade 34 having a common connection 35, and a transformer 36 having a secondary winding 37 and a primary winding 38 connected to a ground terminal 39. Sub-station 22 includes an access area 41, including switch blades 42 and 43 and a fuse blade 44 having a common connection 45, and a transformer 46 having a secondary winding 47 and a primary winding 48 connected to a ground terminal 49. Sub-station 23 includes an access area 51, including switch blades 52 and 53 and a fuse blade 54 having a common connection 55, and a transformer 56 having a secondary winding 57 and a primary winding 58 connected to a ground terminal 59.

Stations 20, 21, 22 and 23 are interconnected in a closed loop by cables 60, 61, 62 and 63 having central insulated conductors and grounded outer shields. The conductive path may be traced from terminal 24 through cable 60, blade 32, connection 35, blade 33, cable 61, blade 42, connection 45, blade 43, cable 62, blade 52, connection 55, blade 53, and cable 63 back to terminal 24. The circuits in all cases are completed through the grounding shields. The shields of cables 60 and 63 are grounded at 25. The shields of cables 60 and 61 are grounded at 39. The shields of cables 61 and 62 are grounded at 49. The shields of cables 62 and 63 are grounded at 59. It will be evident that if any one of cables 60-63 experiences failure, all three of the sub-stations can still be energized.

Figure 8:
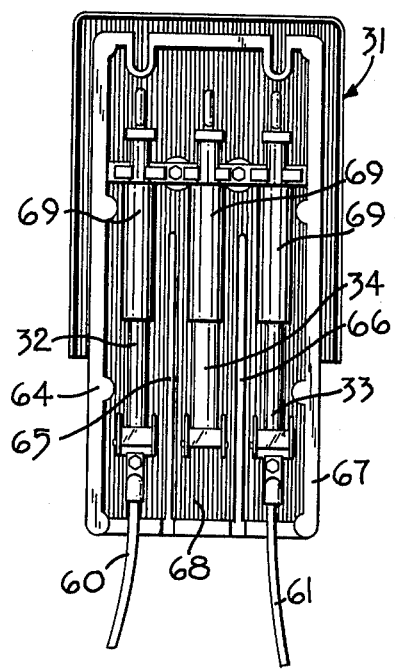

The system just described is called a bottom feed transformer system because the connection for the transformer primary is the central one at the bottom of access area 31. FIG. 8 shows area 31 in more detail, and it will there be noted that the connecting points for cables 60 and 61, for example, are at the bottoms of narrow spaces defined by walls 64, 65, 66 and 67 for isolation purposes, and hence are very difficult of access. The connection to the transformer indeed passes directly through the base 68 of the area and is not available in the area at all. Blades 32, 33, and 34 are here shown as equipped with standard arc snuffers 69.

FIG. 7 shows an electrical distribution system made up of a power station 70 and three sub-stations 71, 72, and 73. Power station 70 is shown schematically as supplying high voltage electricity between a pair of terminals 74 and 75, the latter of which is grounded at 76.

Sub-station 71 includes an access area 81, including switch blades 82 and 83 and a fuse blade 84 having a common connection 85, and a transformer 86 having a secondary winding 87 and a primary winding 88 connected to a ground connection 89. Sub-station 72 includes an access area 91 including switch blades 92 and 93 and a fuse blade 94 having a common connection 95, and a transformer 96 having a secondary winding 97 and a primary winding 98 connected to a ground terminal 99. Sub-station 73 includes an access area 101, including switch blades 102 and 103 and a fuse blade 104 having a common connection 105, and a transformer 106 having a secondary winding 107 and a primary winding 108 connected to a ground terminal 109.

Stations 70, 71, 72 and 73 of FIG. 7 are interconnected by cables in the same fashion as are the stations of FIG. 6. FIG. 7 is added for completeness of disclosure: it will be evident that the problems of access in this arrangement are as difficult as those in the structure of FIG. 6.

It will also be understood that as a practical matter ground connections 39, 49, 59, 89, 99 and 109 are located within their respective access areas, as shown explicitly for ground connections 25 and 75.

Referring now to FIGS. 1–4, my grounding blade is shown to comprise a tube 110 of strong insulating material, from which project a pair of heavy conductors 111 and 112, the former carrying the bottom or hinge terminal fitting 113 common to fuse and switch blades, and the latter extending to an insulative "hot stick" loop 114.

Members 110–112 are tightly secured together in any suitable fashion, and tube 110 may have previously been filled with further insulating material 115 if this is considered desirable. For the purposes of this invention no arc snuffers are needed. As a matter of fact, members 111–114 may indeed be portions of switch blades discarded for other reasons, so that member 113 will readily fit any hinge terminal 116 in its load rating and member 112 will similarly fit the spring jaws of any common connection 35.

A conventional cable clamp 117 is brazed or welded to member 111, and a similar clamp 118 is secured in like fashion to member 112. Clamps 117 and 118 are in axially aligned relation as shown in FIG. 3, so that if desired a conductor can readily be led between them.

Figure 9:
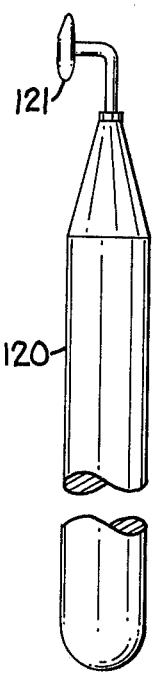
Figure 10:

All operations involving placement and removal of switch blades, fuse blades, or my grounding blades, are conducted for reasons of safety using a "hot stick" shown in FIGS. 9 and 10 to comprise a rod 120 several feet long of highly insulating material carrying at one end a fitting 121 arranged to enter and remain in loop 114.

Fitting 113 is shown to comprise a pair of coaxial pin portions 130, 131 and a heel portion 132. Pin portions 130 and 131 are arranged to engage bayonet slots 134 and 133 in hinge terminal 116, and heel portion 132 is arranged to engage a spring 135 in the terminal so as to force pin portions 131, 130 outward in slots 133 and 134 as the ground blade is pushed into position. Near the end of the insertion process portion 112 engages and moves past ribs 140 in a contact clip 141 which is a portion of common connection 35 for example, and has an additional external spring 142. Suitable stop means, not shown, are provided for limiting the entrance of member 112 into clip 141. Thus insertion and removal of grounding devices according to my invention uses only skills already acquired by maintenance personnel.

Figure 11:
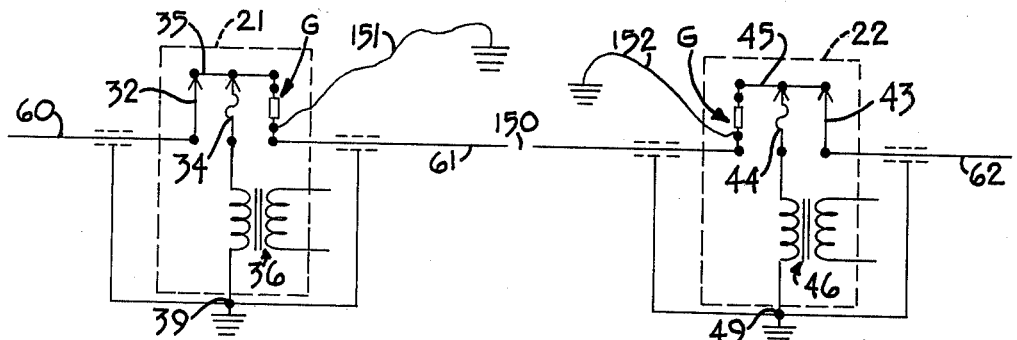
FIGS. 11-13 show various details of use of my invention.

FIG. 11 shows a portion of the system of FIG. 6 including sub-stations 21 and 22 and cables 60–62, and illustrates a fault such as a break 150 in cable 61. Before maintenance work is begun, switch blade 33 at sub-station 21 and switch blade 42 at sub-station 22 are removed. A grounding cable 151 is connected to clamp 117 of one of my grounding blades, which is then used as shown at G in the Figure to replace switch blade 33 at sub-station 21, insulating tube 110 isolating the grounding cable from common connection 35. A similar substitution, with a grounding cable 152, is made at sub-station 22. Cable 61 is now properly grounded at both ends, and maintenance work can be performed with perfect safety.

It will be apparent that if the fault just outlined should occur in system of FIG. 7, the same procedures would be followed, except that the grounding cables would be connected to clamps 118 in my grounding blades rather than to clamps 117.

Figure 12:
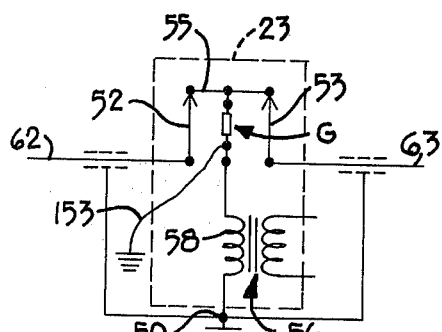

Consider now the case of need to work on a transformer. This situation is illustrated in FIG. 12, showing sub-station 23 and cables 62 and 63. When it is desired to work on transformer 56, fuse blade 54 is removed. A grounding cable 153 is connected to clamp 117 of one of my grounding blades, which is then used as shown at G in FIG. 12 to replace fuse blade 54, insulating tube 110 again isolating the grounding cable from common connection 55. Transformer 58 is now grounded and can be worked on in safety.

It will be apparent that if the fault just outlined should occur in the system of FIG. 7, the same procedure would be followed, except that the grounding cable would be connected to clamp 118 in my grounding blade rather than to clamp 117.

Figure 13:
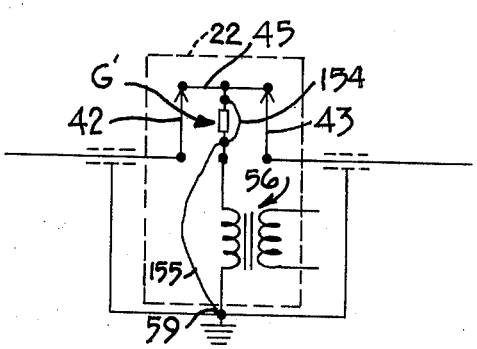

It occasionally becomes desirable at a particular sub-station to ground the transformer and all cables connected to the station. When this is necessary, one of my grounding blades is prepared by removing the insulation from a considerable length of a grounding cable, passing the bare cable through both of clamps 117 and 118 and securing it thereto. This is illustrated in FIG. 13 which also shows that as a practical matter the ground connection itself, shown independent in FIGS. 11 and 12 for clarity of illustration, is usually made to the ground terminal of the particular station. FIG. 13 shows sub-station 22 as completely grounded. Its fuse blade 44 has been replaced by the especially prepared grounding blade G' just described, the bared portion 154 of grounding cable 155 being clearly shown, and cable 155 being connected to ground terminal 59.

From the foregoing it will be clear that I have invented a new grounding accessory and procedure for use in maintenance of high voltage transmission systems, including a grounding blade physically interchangeable with standard fuse and switch blades, but provided with connections for receiving an auxiliary grounding cable or cables.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A grounding device dimensionally interchangeable with a switch blade in high voltage electrical distribution systems comprising, in combination:
   an elongated member of electrically insulating material;
   a first electrically conductive member, at one end of said elongated member, configured like the lower terminal of a switch blade;
   a second electrically conducting member, at the other end of said elongated member, configured like the upper terminal of a switch blade;
   and means carried by each of said conducting members for connecting an electrical conductor thereto.

2. A grounding device dimensionally interchangeable with a fuse blade in high voltage electrical distribution systems comprising, in combination:
   an elongated member of electrically insulating material;

a first electrically conductive member at one end of said elongated member configured like the lower terminal of a fuse blade;

a second electrically conducting member at the other end of said elongated member configured like the upper terminal of a fuse blade, and including an insulated hot stick loop;

and means carried by each of said conducting members for connecting an electrical conductor thereto.

3. The method of grounding a conductor in an electrical distribution system which comprises substituting, for a removable switch blade normally connected at one end to said conductor, a grounding device dimensionally interchangeable with said switch blade and having a grounded conductor connected thereto at said one end.

4. The method of grounding a conductor in an electrical distribution system which comprises substituting, for a removable fuse blade normally connected at one end to said conductor, a grounding device dimensionally interchangeable with said fuse blade and having a grounded conductor connected thereto at said one end.

* * * * *